L. G. WOODS.
CAR WHEEL.
APPLICATION FILED APR. 15, 1909.
950,500. Patented Mar. 1, 1910.
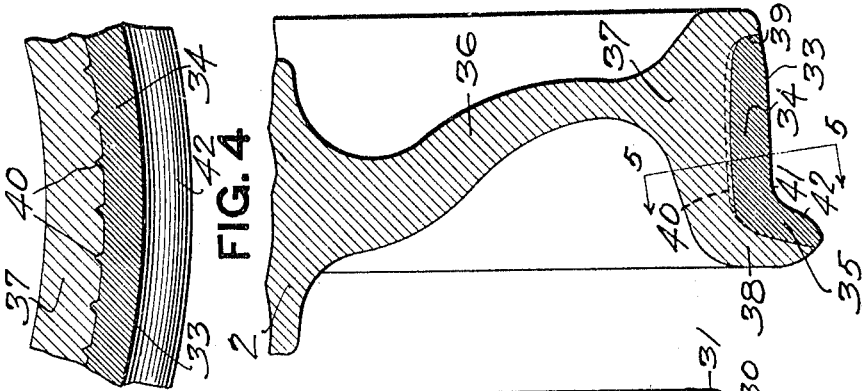
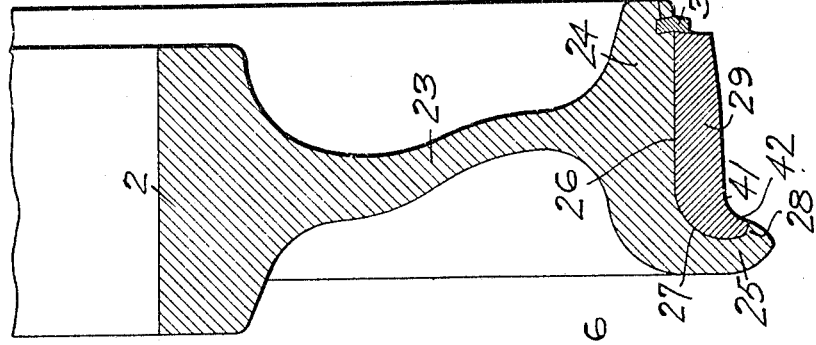
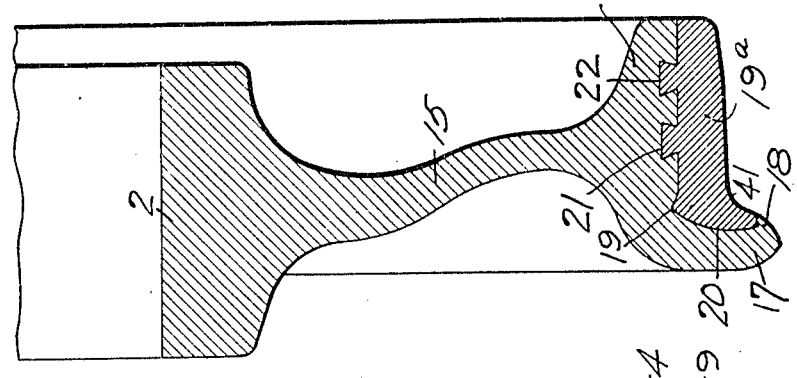
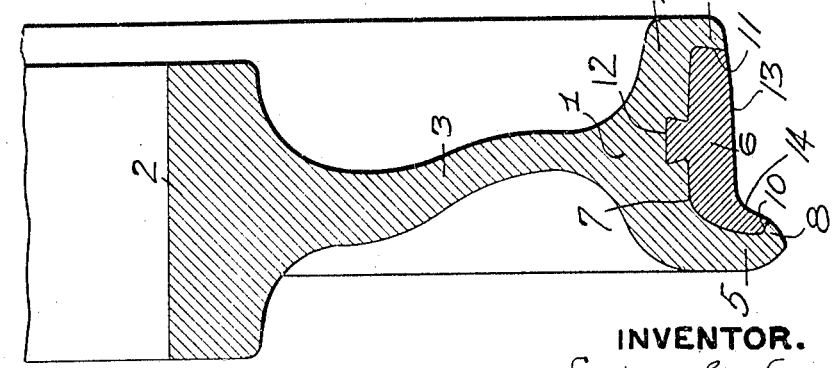
WITNESSES.
INVENTOR.
Leonard G Woods
By Kay & Totten
Attorneys.

UNITED STATES PATENT OFFICE.

LEONARD G. WOODS, OF PITTSBURG, PENNSYLVANIA.

CAR-WHEEL.

950,500.  Specification of Letters Patent.  Patented Mar. 1, 1910.

Application filed April 15, 1909. Serial No. 490,179.

*To all whom it may concern:*

Be it known that I, LEONARD G. WOODS, a resident of Pittsburg, in the county of Allegheny and State of Pennsylvania, have invented a new and useful Improvement in Car-Wheels; and I do hereby declare the following to be a full, clear, and exact description thereof.

My invention relates to car wheels, its object being to provide a car wheel having a strong tough body and a hard wearing surface on the rim and flange.

It is a well known fact that the chilled cast iron wheel provides the hardest wearing surface and has the longest life under ordinary conditions of any car wheels now in use. Their weakness resides in the fact that as the entire body is made of cast iron and some grades of chilled cast iron are rather weak, they have not the necessary strength, especially in the flange portions thereof and are liable to break under sudden jars or transverse strains, this leading to serious accident. To overcome such difficulties wheels have been made of steel, either cast or forged to shape by rolling or die forging. It is found, however, that while the body of the steel wheel is tough and strong the wearing surface thereof is so much softer than that of the chilled cast iron wheel that it wears out more rapidly.

The object of the present invention is to provide a car wheel by which these difficulties are overcome and by which a definite thickness of hard wearing surface may be provided on the rim and flange of the wheel while insuring sufficient strength of rim, flange and body to sustain transverse and like strains.

The invention consists, generally stated, in a car wheel having a soft steel or like tough and strong body with the main body of its rim and flange integral therewith and having a separately forged working surface or sleeve of harder metal such as chilled cast iron or hard steel secured upon the rim and the inner face of the flange.

In the accompanying drawings the invention is illustrated in different forms; Figures 1 and 2 showing the chilled surface secured upon the wheel body by casting; Fig. 3 showing the same formed of a separate piece secured in place by mechanical means; Fig. 4 showing the wearing surface first cast separate and the body of the wheel within and around such surface; and Fig. 5 is a detail section on the line 5—5, Fig. 4.

The body 1 of the wheel is formed of a strong tough metal suitable for the purpose, the object being to form the same as strong as practicable to sustain the great strains brought upon car wheels both in carrying the load and also in sustaining the side strains brought upon the flange thereof, the car wheel having the hub 2, the web 3, the rim 4, and the flange 5 formed integral and formed of the tough strong metal as above referred to. I may employ for the body of the wheel any suitable metal, for example, a soft tough steel of low carbon which may be strengthened by any suitable alloying to produce as strong and tough a body as practicable. The body may be formed either by casting or by forging, being either rolled or die-forged, as may be desired.

The hard metal wearing surface or sleeve 6 may be formed of any suitable material having high wearing qualities, for example, chilling cast iron or a hard high carbon steel or steel alloy.

In the employment of the invention I may either first form the body of the wheel and then secure the hard metal wearing surfacing to it, or I may form the hard metal surfacing separate and cast or forge the body of the wheel around it as found desirable, or the two may be formed separate and secured together by suitable mechanical means.

I have illustrated the invention in several different forms and will now describe the same. In Fig. 1 the wheel has the seat 7 to receive the hard surface portion or sleeve 6 which is practically dove-tailed therein. For example, the flange 5 has the inwardly projecting lip portion 8 while the rim has the outwardly projecting lip 9, the inner faces 10—11 of the lips 8 and 9 practically form dove-tails at the ends of the seats 7 to hold in the hard metal wearing surface 6. I also prefer to form within the rim the dove-tail pockets 12 which extend at intervals down into the body 4 thereof to further lock the hard metal surfacing 6 within the rim and sustain it against circumferential movement or strains such as in the application of brakes which might lead to the turning of the surfacing 6 upon the body of the wheel. The hard metal surfacing can be secured within the recess 7 of the soft steel wheel by casting, the steel wheel being first properly re-heated and set within a suitable mold, and the other metal surfacing then cast through a suitable gate, so as to fill the recess 7 and form the hard metal surfacing both on the rim, as at 13, and on the inner face of the flanges, as at 14. In so forming the surfacing I prefer to employ chilled cast iron, which can be cast against a suitable chill to form a hard wearing surface thereon.

Fig. 2 illustrates practically the same idea of means except that the inner lip 9 of Fig. 1 is done away with and the dove-tail holding the wheel in place is formed at another place. In that case the soft steel wheel body has the web 15, the rim 16 and the flange 17, and at the upper inner edge of said flange 17 is the inwardly projecting lip 18 which with the depression or seat 19 at the base of the flange portion forms a dove-tail seat 20 to hold the hard metal surfacing 19 to the wheel rim. As the main strain is against the flange of the wheel and the hard metal surfacing naturally binds to the wheel body, such dove-tail seat 20 may be sufficient to hold the hard wearing surface in place, but I may also employ one or more rows of dove-tail pockets 21—22 extending into the main body of the rim as shown to hold the hard wearing surface in place.

In Fig. 3 I have illustrated the invention where the hard metal surfacing is formed separate and secured in place mechanically. In such construction the wheel has the web 23, a rim 24, flange 25 formed integral and of soft steel or the like, and the facing 26 of the main body of the rim is made either straight or slightly flaring toward the flange 25, and carried thence around the inner face of the flange, as at 27, terminating in the inwardly turned lip 28. The hard metal surfacing or sleeve 29 can in this case be cast, or otherwise formed, and suitably dressed to fit the outer faces 26, 27 and 28 of the main wheel rim and flange, and it may be held in place by shrinking or by other suitable mechanical device, for example, by the annular key 30 fitting in an annular groove 31 formed in the body 24 of the rim, the key being placed therein after the hard wearing surface or sleeve 29 has been slipped over the body of the rim and forced to place, and, by suitable machinery, the ring 30 may be forced against the annular sleeve 29 forming the hard wearing surface and bind it in place. In this construction it is evident that any suitable hard metal may be employed for forming the wearing surface such as a very high carbon steel or other steel alloy.

In Fig. 4 I have illustrated the invention where the hard metal wearing surfacing is first cast or otherwise formed and the soft steel wheel with its rim cast within and around the edges of the same. For instance, the hard metal surfacing 33 is formed with the main body portion 34 and the flange portion 35, this being either cast or otherwise formed of chilling cast iron or of hard steel. Such ring or sleeve so formed is then set within the mold and suitably supported therein, and the main body of the wheel is then cast against it, forming the web 36 and the main body 37 of the rim and the main body 38 of the flange, the inner edge 37 of the rim preferably extending around the inner edge of the hard metal surfacing as at 39. In such case the molten steel so cast to the outer hard ring will to some extent act to melt or fuse the surface thereof and unite therewith, forming a sufficiently strong union to hold the hard metal ring forming the outer surface in place. To aid such fusion between the body and the outer surfacing I prefer to form on the meeting surface of the part first cast a series of thin projections, such as the fins 40, to be surrounded by the molten metal and be more quickly melted thereby and cause more perfect union between the outer sleeve and body, as indicated in Figs. 4 and 5.

In any of the forms of the invention as above illustrated, it will be seen that the thickness and size of the hard metal sleeve or ring forming the wearing surface of the wheel is determined either by the shape of the main body of the wheel to which such hard metal sleeve is cast, or by the previous shaping of the hard metal sleeve or both, and by forming the sleeve separately from the body of the wheel, the proper thickness of wearing surface can thus be obtained. I am also enabled to insure sufficient thickness of soft tough metal in the integral flange portion of the main wheel body to give all the strength necessary in the flange of the finished wheel, insuring a sufficient thickness to resist all ordinary side or transverse, torsional or other strains. At the same time as the wear upon the wheel comes upon the outer surface of the rim and on the inner face of the flange, these parts are protected by a hard metal surfacing which will resist wear and so greatly extend the life of the wheel. It is well known that the particular wear on such wheels comes on what is known as the throat or neck, such as at the point 41 in the different wheels as shown, and a hard wearing surface is provided at this point and on the inner face 42 of the flange, which will resist the wear to a far greater extent than any steel wheel whether of cast or forged steel. Some of the forms as illustrated will permit the re-surfacing of the wheel, as in case the hard metal surface cracks or wears to such extent as to make it desirable to re-surface the same, the hard metal ring forming such wearing surface can in some cases be removed and replaced.

The wheel is therefore capable of much longer service than the ordinary steel wheel, giving as long service as the iron wheel and having double or more the strength of body or flange.

What I claim is:

1. A car wheel having its rim and flange integral with the wheel body and formed of soft, tough metal, and having a separately formed wearing surface or sleeve of harder metal secured upon the rim and inner face of the flange.

2. A car wheel having the rim and flange integral with the main body and formed of soft metal and having a separately formed wearing surface or sleeve of hard metal secured upon the rim and inner face of the flange.

3. A car wheel having the rim and flange integral with the main body and formed of soft steel, and having a separately formed wearing surface or sleeve formed of chilled cast iron secured upon the rim and inner face of the flange.

4. A car wheel having a rim and flange formed of soft tough metal and having a dove-tailed seat and a separately formed wearing surface or sleeve of hard metal secured upon the rim and the inner face of the flange and seated in said dove-tail.

5. A car wheel having a rim and flange formed of soft tough metal, the flange having an in-turned lip and the rim having an outwardly projecting lip so forming a dove-tailed seat, and a separate wearing surface or sleeve of harder metal secured upon said rim and the inner face of the flange and within such dove-tailed seat.

6. A car wheel having a rim and flange of soft tough metal and a depression in the rim and inner face of the flange, and having separate pockets formed in the said depression of the rim, and a separately formed working surface of hard metal secured upon the rim and the inner face of the flange and seated within said pockets.

In testimony whereof, I the said LEONARD G. WOODS have hereunto set my hand.

LEONARD G. WOODS.

Witnesses:
L. M. BURNETT,
F. E. SCHAEFFER.